(12) United States Patent
Pyzik et al.

(10) Patent No.: US 9,174,158 B2
(45) Date of Patent: Nov. 3, 2015

(54) CEMENT TO MAKE THERMAL SHOCK RESISTANT CERAMIC HONEYCOMB STRUCTURES AND METHOD TO MAKE THEM

(75) Inventors: Aleksander J. Pyzik, Midland, MI (US); Nicholas M. Shinkel, Bay City, MI (US); Arthur R. Prunier, Jr., Midland, MI (US); Janet M. Goss, Saginaw, MI (US); Kwanho Yang, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 757 days.

(21) Appl. No.: 13/501,853

(22) PCT Filed: Oct. 27, 2010

(86) PCT No.: PCT/US2010/054184
§ 371 (c)(1),
(2), (4) Date: Apr. 13, 2012

(87) PCT Pub. No.: WO2011/059699
PCT Pub. Date: May 19, 2011

(65) Prior Publication Data
US 2012/0207967 A1 Aug. 16, 2012

(51) Int. Cl.
*B01D 46/24* (2006.01)
*C04B 38/00* (2006.01)
(Continued)

(52) U.S. Cl.
CPC ........ *B01D 46/2448* (2013.01); *B01D 46/2444* (2013.01); *C04B 26/285* (2013.01); *C04B 35/185* (2013.01); *C04B 37/005* (2013.01); *C04B 38/0006* (2013.01); *C04B 38/0019* (2013.01); *B01D 46/2425* (2013.01); *B01D 46/2459* (2013.01); *B01D 2046/2433* (2013.01); *B01D 2046/2437* (2013.01); *B01D 2046/2496* (2013.01); *C04B 2111/00793* (2013.01); *C04B 2111/2084* (2013.01); *C04B 2111/343* (2013.01); *C04B 2235/322* (2013.01); *C04B 2235/3217* (2013.01); *C04B 2235/349* (2013.01);
(Continued)

(58) Field of Classification Search
CPC ................ C04B 2235/5208; C04B 2235/5216
See application file for complete search history.

(56) References Cited

U.S. PATENT DOCUMENTS 4,304,585 A 12/1981 Oda et al.
4,329,162 A 5/1982 Pitcher, Jr.
(Continued)

FOREIGN PATENT DOCUMENTS

EP 1508356 B1 12/2006
EP 1516659 B1 12/2006
(Continued)

OTHER PUBLICATIONS

Reed, J., Chapters 10-12, Introduction to the Principles of Ceramic Processing, John Wiley and Sons, NY, NY, 1988.
(Continued)

*Primary Examiner* — David Sample
*Assistant Examiner* — Nicholas W Jordan
(74) *Attorney, Agent, or Firm* — Kevin J. Nilsen

(57) ABSTRACT

An improved ceramic honeycomb structure is comprised of at least two separate smaller ceramic honeycombs that have been adhered together by a cement layer comprised of a cement layer has at least two regions of differing porosity or cement layer where the ratio of toughness/Young's modulus is at least about 0.1 MPa·m$^{1/2}$/GPa.

14 Claims, 2 Drawing Sheets

(51) Int. Cl.
*C04B 26/28* (2006.01)
*C04B 35/185* (2006.01)
*C04B 37/00* (2006.01)
*C04B 111/00* (2006.01)
*C04B 111/20* (2006.01)
*C04B 111/34* (2006.01)

(52) U.S. Cl.
CPC . *C04B2235/3463* (2013.01); *C04B 2235/3826* (2013.01); *C04B 2235/425* (2013.01); *C04B 2235/5436* (2013.01); *C04B 2235/96* (2013.01); *C04B 2237/062* (2013.01); *C04B 2237/341* (2013.01); *C04B 2237/597* (2013.01); *C04B 2237/708* (2013.01); *F01N 2330/06* (2013.01); *F01N 2330/30* (2013.01); *F01N 2450/28* (2013.01); *Y10T 428/24149* (2015.01)

(56) References Cited

U.S. PATENT DOCUMENTS

| | | | |
|---|---|---|---|
| 4,335,783 | A | 6/1982 | McBrayer et al. |
| 4,416,676 | A | 11/1983 | Montierth |
| 4,417,908 | A | 11/1983 | Pitcher, Jr. |
| 4,642,210 | A | 2/1987 | Ogawa et al. |
| 4,652,286 | A | 3/1987 | Kusuda et al. |
| 4,953,627 | A | 9/1990 | Ito et al. |
| 5,098,455 | A | 3/1992 | Doty et al. |
| 5,173,349 | A | 12/1992 | Yavuz et al. |
| 5,194,154 | A | 3/1993 | Moyer et al. |
| 5,198,007 | A | 3/1993 | Moyer et al. |
| 5,322,537 | A | 6/1994 | Nakamura et al. |
| 5,340,516 | A | 8/1994 | Yavuz et al. |
| 5,914,187 | A | 6/1999 | Naruse et al. |
| 6,306,335 | B1 | 10/2001 | Wallin et al. |
| 6,596,665 | B2 | 7/2003 | Wallin et al. |
| 6,669,751 | B1 | 12/2003 | Ohno et al. |
| 6,797,666 | B2 | 9/2004 | Harada et al. |
| 7,112,233 | B2 | 9/2006 | Ohno et al. |
| 7,425,297 | B2 | 9/2008 | Saha et al. |
| 8,039,085 | B2 | 10/2011 | Ichikawa et al. |
| 2001/0038810 | A1 | 11/2001 | Wallin et al. |
| 2004/0020359 | A1 | 2/2004 | Koermer et al. |
| 2006/0197265 | A1 | 9/2006 | Saha et al. |
| 2008/0274324 | A1* | 11/2008 | Mizutani ............ 428/73 |
| 2008/0283465 | A1* | 11/2008 | Liu et al. ............ 428/116 |
| 2009/0029104 | A1* | 1/2009 | Iwata et al. ......... 428/116 |
| 2009/0041975 | A1* | 2/2009 | Kodama et al. ..... 428/116 |
| 2009/0239030 | A1 | 9/2009 | Cai et al. |

FOREIGN PATENT DOCUMENTS

| | | |
|---|---|---|
| EP | 1142619 B1 | 1/2007 |
| EP | 1508355 B1 | 1/2007 |
| EP | 1997790 A1 | 12/2008 |
| EP | 2008985 A1 | 12/2008 |
| EP | 2138475 A1 | 12/2009 |
| EP | 1974789 B1 | 3/2011 |
| EP | 2112129 B1 | 8/2013 |
| JP | 647620 | 6/1994 |
| WO | 03051488 A1 | 6/2003 |
| WO | 03082773 A1 | 10/2003 |
| WO | 2004011124 A1 | 2/2004 |
| WO | 2004011386 A1 | 2/2004 |
| WO | 2005091821 A2 | 10/2005 |

OTHER PUBLICATIONS

De With, G., "Small-Specimen Double-Cantilever-Beam Test Applicable to Monolith and Joints," J. Am. Ceram. Soc., 72 [4], 710-12, 1989.

Moorhead, A.J., et al., "Adaptation of the DCB Test for Determining Fracture Toughness of Brazed Joints in Ceramic Materials," Journal of Materials Science, 22, 3297-3308, 1987.

\* cited by examiner

CEMENT TO MAKE THERMAL SHOCK RESISTANT CERAMIC HONEYCOMB STRUCTURES AND METHOD TO MAKE THEM

CLAIM OF BENEFIT OF FILING DATE

The present application claims the benefit of the filing date of U.S. Application Ser. No. 61/2760,043, filed Nov. 11, 2009, which is hereby incorporated by reference for all purposes.

FIELD OF THE INVENTION

The present invention relates to a ceramic filter having improved thermal shock resistance and method to make them. In particular, the filter and method relate to the use of an improved ceramic cement for assembling ceramic particulate filters together to make a larger thermal shock resistant filter.

BACKGROUND OF THE INVENTION

Diesel engines, because of the way they operate, emit soot particles or very fine droplets of condensate or a conglomerate of the two (particulates) as well as typical harmful gasoline engine exhausts (i.e., HC and CO). These "particulates" (herein Diesel soot), are rich in condensed, polynuclear hydrocarbons, some of which may be carcinogenic.

As the awareness of the danger Diesel soot presents to health collides with the need for greater fuel efficiency that Diesel engines provide, regulations have been enacted curbing the amount of Diesel soot permitted to be emitted. To meet these challenges, soot filters have been used. When using such a filter, the filter must be periodically regenerated by burning off the soot. This burning of soot results in stresses from axial and radial temperature differences that can cause cracking of the filter.

To overcome stresses ceramic honeycombs such as heat exchangers and filters have reduced the stresses and potential for cracking the honeycombs by assembling smaller honeycombs into larger honeycombs. Cement layers between the honeycombs have been used, for example, to increase the thermal conductivity to reduce the ultimate temperature reached in the assembled honeycomb such as described by EP 1508355. To achieve the improved thermal conductivity, these cements/sealing layers/adhesives have used ceramic particulates to increase the thermal mass/conductivity and ease of application to the smaller honeycomb segments. Often such cements include ceramic fibers, ceramic binder and organic binder such as described by U.S. Pat. No. 5,914,187 to facilitate application of the cement prior to firing (e.g., reduce segregation of particulates) and improve some mechanical property such as toughness of the cement.

Unfortunately, the use of these augmenting materials results in problems in using the cement or reduced effectiveness. For example, the use of organic binder helps in reducing separation of particles in the cement, but then must be removed slowing the process to make the part and also risking damage due to thermal gradients due to combustion of the organics and pressure from evolving gases. The use of fibers also tends to lower the thermal mass and thermal conductivity of the cement layer due to inefficient packing and inability to load the fibers to any great extent into a carrier fluid without excessive viscosity increases.

Therefore, it would be desirable to provide an assembled larger honeycomb from smaller ceramic honeycombs and method to do so that avoids one or more problems described above.

SUMMARY OF THE INVENTION

One aspect of this invention is a ceramic honeycomb structure comprised of at least two separate smaller ceramic honeycombs (honeycomb segments) that have been adhered together by a cement layer comprised of fibers in which the cement layer has at least two regions of differing porosity. In a particular embodiment, the cement has isolated regions of mullite fibers surrounded by a continuous matrix of mullite fibers where the isolated regions of mullite fibers have a porosity lower than the continuous matrix of mullite fibers.

Another aspect of the invention is a method of forming a honeycomb structure comprising a) contacting a first honeycomb segment on at least one of its outer surfaces with a cement comprised of (i) a first fiber composition comprised of agglomerates comprised of inorganic fibers, precursors that form inorganic fibers upon heating or combination thereof, (ii) a second fiber composition comprised of inorganic fibers, particulate precursors that form inorganic fibers upon heating or combination thereof and a porogen and, (iii) a carrier fluid, (b) contacting a second honeycomb segment with the first honeycomb segment such that the cement is interposed between said honeycomb segments such that said honeycomb segments are adhered and, (c) heating the adhered segments sufficiently to remove the carrier fluid and react, bond or combination thereof the first and second fiber compositions so that said segments are adhered together by a cement layer comprised of fibers chemically bonded together in which the cement layer has at least two regions of differing porosity.

In another aspect, the invention is a method to make a ceramic cement comprising (a) forming a first fiber composition comprised of agglomerates that are comprised of inorganic fibers, precursors that form inorganic fibers upon heating or combination thereof, and (b) mixing the first fiber composition, (ii) a second fiber composition comprised of inorganic fibers or particulate precursors that form inorganic fibers upon heating and a porogen and, (iii) a carrier fluid, wherein said agglomerates during the mixing substantially fail to break-up.

A further aspect of the invention is a ceramic cement comprising a carrier liquid having therein a first fiber composition comprised of agglomerates that are comprised of inorganic fibers, precursors that form inorganic fibers upon heating or combination thereof, and a second fiber composition comprised of inorganic fibers, particulate precursors that form inorganic fibers upon heating or combination thereof and a porogen, wherein said agglomerates remain in the carrier fluid without substantially breaking up into individual fibers or precursors.

A final aspect is a ceramic cement comprising ceramic grains chemically bonded together wherein said cement has at least two regions within the cement having different porosities and the cement has a $K_{IC}$/toughness $(MPa \cdot m^{1/2})$/Young's modulus (GPa) ratio of at least 0.1.

The ceramic honeycomb structures may be used in any applications requiring resistance to hot gases or liquids such as heat exchangers, catalyst supports and filters (e.g., molten metal and soot filters). The cement may be used to make porous ceramics requiring improved thermal shock resistance such as the aforementioned honeycomb structures. The cement may be used to coat the outer periphery (skin), precluding the open channel ends, of the honeycomb structures or honeycomb monoliths to improve the dimensional tolerance, thermal shock resistance or combination thereof.

DETAILED DESCRIPTION OF THE INVENTION

The Ceramic Cement

Figure 1:
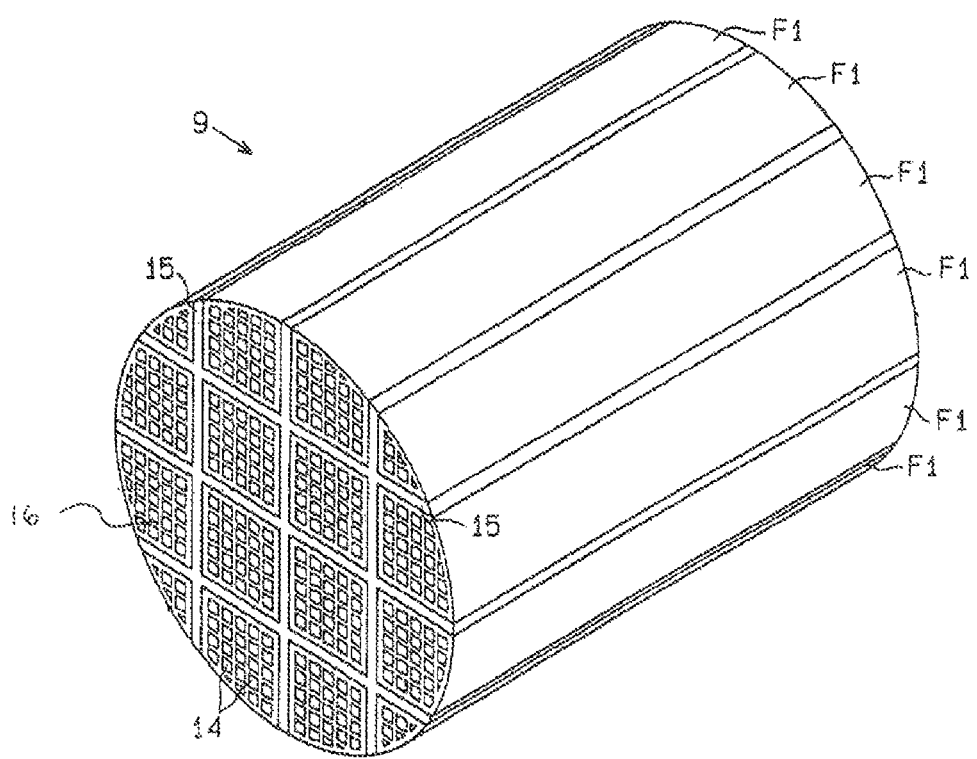
FIG. 1 is a perspective view of the honeycomb structure of this invention.

The cement of this invention comprises a carrier liquid having therein a first fiber composition and second fiber composition. The carrier liquid may be, for example, water, any organic liquid, such as an alcohol, aliphatic, glycol, ketone, ether, aldehyde, ester, aromatic, alkene, alkyne, carboxylic acid, carboxylic acid chloride, amide, amine, nitrile, nitro, sulfide, sulfoxide, sulfone, organometallic or mixtures thereof. Preferably, the carrier fluid is water, an aliphatic, alkene or alcohol. More preferably, the liquid is an alcohol, water or combination thereof. When an alcohol is used, it is preferably methanol, propanol, ethanol or combinations thereof. Most preferably, the carrier fluid is water.

The total amount of carrier fluid that is used may vary over a wide range depending on other organic additives such as those described below and the solids loading of the first and second fiber compositions in the cement and the technique used to contact the segments together. The total amount of carrier liquid, generally, is at least about 40% by volume to at most about 90% of the inorganic fraction of the cement.

The first fiber composition in the cement is comprised of agglomerates that are comprised of inorganic fibers, precursors that form inorganic fibers upon heating or combination thereof. The agglomerates may be hard agglomerates or soft agglomerates. Hard agglomerates are those where individual grains, or fibers are bonded together by ceramic bonds (e.g., Si—O—Si) and to break them into smaller constituents generally requires substantial energy input (e.g., ball milling, attrition, crushing and not mere mixing shear energy). Soft agglomerates are those where individual grains, particulates or fibers are bonded by bonds other than ceramic bonds such as hydrogen bonding, van der Waals forces and the like where mere mixing in the proper solvent at sufficient shear (mixing) may break such agglomerates into smaller constituents.

The cement when utilizing, in particular, soft agglomerates, the carrier liquid is chosen such that it does not disrupt or solvate the bonds holding the agglomerates together. For example, if the soft agglomerate is held together primarily by hydrogen bonding, the carrier liquid is desirably a non-polar liquid such as an alkane that will not solvate the hydrogen bonding of the soft agglomerate. Preferably, the agglomerates are hard agglomerates.

In a particular embodiment, the agglomerates are hard agglomerates of inorganic fibers or precursors of inorganic fibers. Such agglomerates may be made by heating individual fibers or particulates that form fibers to form ceramic bonds. Such bonds may be facilitated by the use of a ceramic binding phase such as an amorphous or crystalline phase binding phase that is illustratively an aluminate, silicate or aluminosilicate.

Hard agglomerates with a binding phase may be made by forming larger bodies and with fibers of the desired size heating such structure until ceramic bonds form bonding the fibers together. The larger body may then be ground (e.g., ball milled) and classified (e.g., sieved) to the desired size by known techniques. The hard agglomerates may also be formed by shaping and sizing the fibers or fiber precursors by known techniques such as spray drying and heating to form the hard agglomerates. The heating, in this embodiment, typically is at least about 600° C., 700° C. or 800° C. to at most about 1800° C., 1700° C., 1600° C., 1500° C., 1400° C. or 1300° C. so long as the temperature is great enough to ceramically bond the fibers, but not too high that the fibers degrade substantially or melt.

In a particular embodiment, mullite is formed having acicular grains (fibers herein) such as described by U.S. Pat. Nos. 5,194,154; 5,173,349; 5,198,007; 5,098,455; 5,340,516; 6,596,665 and 6,306,335; U.S. Patent Application Publication 2001/0038810; and International PCT publication WO 03/082773, each incorporated herein by reference, and subsequently crushed, ground or milled and classified to the desired size by known techniques.

The binding phase if used, for example, may be a colloid, which upon heating forms the binding phase described above. Colloid means a particulate having an average particle size of less than 1 micrometer by number. The colloid may be crystalline or amorphous. Preferably, the colloid is amorphous, with it being understood that such colloid depending on the heating temperature to ceramically bond the cement and segments together may be amorphous or may crystallize.

The colloid is preferably a silicate, aluminate, aluminosilicate sol. Desirably, the colloid is a cation (alkali or ammonium) stabilized or combination thereof silicate stabilized sol, which are commonly referred to as silica colloids or silica sols that have a basic pH. The surface charge of these silica colloids are negative as determined by known electrophoretic techniques. When the sol is an alumina sol/colloid, it desirably is a sol having an acidic pH, where the alumina particles have a positive charge as determined by electrophoretic techniques. Illustrative colloids such as those known in the art and available under the tradenames such as KASIL and N, PQ Corporation, P.O. Box 840, Valley Forge, Pa.; ZACSIL, Zaclon Incorporated, 2981 Independence Rd., Cleveland, Ohio; Sodium Silicates, Occidental Chemical Corporation, Occidental Tower, 5005 LBJ Freeway, Dallas, Tex.; NYACOL Nexsil colloidal silica and Al20 colloidal alumina, Nyacol Nanotechnologies Inc., Ashland, Mass. and Aremco 644A and 644S, Aremco Products Inc., Valley Cottage, N.Y.

If fibers are used to make, for example, the agglomerates with the above binding phases, the fibers typically have an average length of at least about 20, 50, 100, 150, 200 or 225 micrometers to at most about 900, 800, 700, 600, 500 or 400 micrometers. In addition, even though the distribution of the length of the fibers may be wide, typically at least about 50%, 60%, 70%, 75%, 80%, 85%, 90%, 95% to essentially all (e.g., less than 1% of the fibers) of the fibers have a length between 100 to 500 micrometers. Generally, the fiber diameter of the fibers is from about 0.1 micrometer to about 20 micrometers. The fiber diameter may be at least about 0.2, 0.4, 0.6, 0.8, 1, 2 or 4 micrometers to at most about 18, 15, 12, 10 or 8 micrometers. The fibers, also have an aspect ratio length/diameter of at least about 10. Likewise, if precursors are used that are subsequently heated and form fibers to adhere ceramic honeycomb segments together described below, the size of such formed fibers have a like size of the fibers just described.

The fibers may be any useful inorganic fibers such as those known in the art. The fiber may be amorphous or crystalline or combination thereof. The fiber may be amorphous to start and upon heating or use during operation, for example, in a Diesel particulate trap, crystallize to some extent such as described in U.S. Pat. No. 5,322,537. Generally, the fiber is an amorphous silicate or aluminosilicate fiber that may be crystallized to form or have, for example, mullite crystals within the fiber and surrounded by glass. The fiber may also contain other compounds such as rare earths, zirconium, alkaline earths in significant volumes (i.e., greater than 1% by mole and preferably at least about 2%, 3%, 4%, 5%, 7%, or 10% to at most about 40% by mole). Particular examples are aluminosilicate fibers available under the tradename FIBERFRAX, from Unifrax LLC, Niagara Fall, N.Y.; alkaline earth fiber (Mg-silicate fiber) under the tradename ISOFRAX also available from Unifrax and SAFFIL (e.g., SAFFIL RF) alumina fibers available from Saffil LTD. Cheshire, UK.

The cement also is comprised of a second fiber composition. The second fiber composition is comprised of inorganic fibers, particulate precursors that form inorganic fibers upon heating or combination thereof and a porogen. The inorganic fibers may be any of those described for the first fiber composition herein. The particulate precursors may also be the same as those described for the first fiber composition and described below in more detail. In one embodiment the particulate precursors are precursors that form mullite as described in U.S. Pat. Publ. 2006/0197265. Generally, such a mixture that forms mullite is comprised of clay (i.e., hydrated aluminum silicate) and precursor compounds such as, alumina, silica, aluminum trifluoride, fluorotopaz and zeolites. Preferably, the precursor compounds are selected from the group consisting of clay, silica, alumina and mixtures thereof. Most preferably, the mixture is comprised of clay and alumina.

Such a mixture for forming mullite may also contain a property enhancing compound. Such property enhancing compound may be any compound that is an oxide or forms an oxide when the mullite mixture is heated in air, wherein the compound contains an element selected from the group consisting of Mg, Ca, Fe, Na, K, Ce, Pr, Nd, Sm, Eu, Gd, Tb, Dy, Ho, Er, Tm, Yb, Lu, B, Y, Sc, La and combination thereof. Since, the elements listed fail to include Al and Si, the compound necessarily is not a precursor compound (i.e., not a clay or alumina). The property enhancing compound may be an oxide, an inorganic metal salt (e.g., chloride, fluoride, nitrate, chlorate, carbonate) or an organic metal compound such as an acetate. Preferably, the compound is an oxide, hydroxide, nitrate, acetate, carbonate or combination thereof. Most preferably, the compound is an oxide. In a particular preferred embodiment, the property enhancing compound is talc (hydrated Mg silicate). The amount Si in the precursor compounds must be adjusted when using talc as the property enhancing compound due to the presence of Si in the talc.

The second fiber composition also is comprised of a porogen. A porogen is any solid particulate material at the temperature where the carrier liquid is readily removed (e.g., 100° C. when using water as the carrier liquid) that upon sufficient heating in a suitable atmosphere will be removed from the cement leaving behind a pore in the general shape of the porogen particulate. Examples of suitable porogens are those known in the ceramic arts and include, for example, carbon (e.g., graphitic or amorphous), flours (e.g., wood, wheat and rice), synthetic organic polymer particulates/beads (e.g., poly (methyl methacrylate), and polystyrene.

The porogen is of a size that essentially fails to enter into the porosity of the first and second fiber composition agglomerates. The porogen's average equivalent spherical diameter is generally at least about half of the smallest agglomerate size within the ceramic cement to at most about a size that is at most the size of the largest agglomerate in the cement. Typically, the porogen has a size of at least about 1 micrometer, 2, 3, 4, 5, 10, 20, 25, or 50 micrometers to at most about 1000, 750, 500, 400, 300, 250 or 200 micrometers.

The porogen is present in the second fiber composition such that the porosity after the cement is heated forms a region that has a higher porosity as described below. Typically, the amount of porogen in the cement from the second fiber composition is at least about 1% by volume of the inorganic fractions of the cement (those that remain or form the cement layer after heating). Desirably, the porogen amount is at last about 2%, 3%, 4%, 5%, 6%, 7%, 8%, 9%, 10%, 15%, 20%, 25 or even 50% to, generally, at most about 80% of the cement inorganic fractions.

Desirably, the agglomerates of the first fiber composition have an average spherical diameter that is at least about 5, 6, 7, 8, 9, 10, 15, 20 or even 25 times the size of the agglomerates of the second fiber composition. This is particularly desirable when the first and second fiber composition agglomerates are hard agglomerates that have a similar or the same microstructure. This effectuates the formation of the desired porosity of the cement in that the large agglomerates of the first fiber composition has small porosity within the agglomerate and the second fiber agglomerates form a matrix having large porosity linked by the smaller second fiber composition agglomerates.

When fibers are used to make the agglomerates as opposed to precursors that make fibers, the fibers are, typically, first comminuted to the desired size as described above. Any suitable means may be used such as ball/pebble milling, attrition, jet milling or the like at conditions readily determined by one of ordinary skill in the art for the particular technique.

Illustratively, commercially available fibers such as FIBERFRAX or ISOFRAX described above are milled dry in a ball mill using ceramic media such as zircon, alumina, quartz pebbles, zirconia or any other milling media that would not, for example, introduce detrimental impurities.

The fibers of the proper length then may be typically mixed with amorphous colloidal inorganic particles in a carrier fluid to make a cement and agglomerates formed as described above.

The cement may contain other useful components, such as those known in the art of making ceramic pastes. Examples of other useful components include dispersants, deflocculants, flocculants, plasticizers, defoamers, lubricants and preservatives, such as those described in Chapters 10-12 of Introduction to the Principles of Ceramic Processing, J. Reed, John Wiley and Sons, N.Y., 1988. When an organic plasticizer is used, it desirably is a polyethylene glycol, fatty acid, fatty acid ester or combination thereof.

The cement may also contain binders. Examples of binders include cellulose ethers, such as those described in Chapter 11 of Introduction to the Principles of Ceramic Processing, J. Reed, John Wiley and Sons, NY, N.Y., 1988. Preferably, the binder is a methylcellulose or ethylcellulose, such as those available from The Dow Chemical Company under the trademarks METHOCEL and ETHOCEL. Preferably, the binder dissolves in the carrier liquid.

The cement may contain other inorganic particles, which do not react to form fibers, but may advantageously add to a desired property. For example, the particles may have a differing coefficient of thermal expansion such that upon formation and cooling of the honeycomb structure cemented together, localized microcracking around the particulate occurs in the cement layer described below. Such "inert" particles, generally, have a size of at least about 0.2 micrometer to at most about 250 micrometers in diameter and aspect ratio of at most about 10 and generally are crystalline. These particles also do not in any meaningful way contribute to the bonding of the fibers or segments together, but may be bound together with the fibers and segments by a binding phase. Examples of such other inorganic particles are alumina, silicon carbide, silicon nitride, mullite, cordierite and aluminum titanate. In a particular embodiment, the particulates are silicon carbide in mullite cement layer.

The cement, generally and desirably has a shear thinning behavior. Shear thinning means that the viscosity at a higher shear rate is lower than the viscosity at a lower shear rate. Illustratively, the viscosity at a low shear rate (i.e., about 5 s$^{-1}$) is typically at least about 5, 10, 25, 50, 75 or even 100 Pa·s, and the viscosity at high shear (i.e., about 200 s$^{-1}$) is typically at most about 1, 0.5, 0.1, 0.05, or even 0.01 Pa·s. Such viscosity measurements may be made by rheometers for measuring such cements at such shear rates and viscosities as the one described herein.

It has been discovered that when the cement as described herein is heated sufficiently to form ceramic (chemical bonds), a ceramic cement is formed comprising ceramic grains chemically bonded together wherein said cement has at least two regions within the cement having different porosities and the cement has a $K_{IC}$/toughness (MPa·m$^{1/2}$)/Young's modulus (GPa) ratio of at least 0.1. Such ratio surprisingly leads to ceramic honeycomb structures as described herein with excellent thermal shock resistance even for ceramics with higher coefficients of thermal expansion such as mullite. Desirably, said ratio is at least 0.15 or even 0.2 or greater.

Honeycomb Structure

The smaller ceramic honeycombs F1 (i.e., honeycomb segments) may be any suitable porous ceramic, for example, such as those known in the art for filtering Diesel soot. Exemplary ceramics include alumina, zirconia, silicon carbide, silicon nitride and aluminum nitride, silicon oxynitride and silicon carbonitride, mullite, cordierite, beta spodumene, aluminum titanate, strontium aluminum silicates, and lithium aluminum silicates. Preferred porous ceramic bodies include silicon carbide, cordierite, aluminum titanate and mullite or combination thereof. The silicon carbide is preferably one described in U.S. Pat. No. 6,669,751B1 and WO publications EP1142619A1, WO 2002/070106A1. Other suitable porous bodies are described by U.S. Pat. No. 4,652,286; U.S. Pat. No. 5,322,537; WO 2004/011386A1; WO 2004/011124A1; US 2004/0020359A1 and WO 2003/051488A1.

The mullite is preferably a mullite having an acicular microstructure. Examples of such acicular ceramic porous bodies include those described by U.S. Pat. Nos. 5,194,154; 5,173,349; 5,198,007; 5,098,455; 5,340,516; 6,596,665 and 6,306,335; U.S. Patent Application Publication 2001/0038810; and International PCT publication WO 03/082773.

The ceramic making up the honeycomb segments F1, generally, has a porosity of about 30% to 85%. Preferably, the porous ceramic has a porosity of at least about 40%, more preferably at least about 45%, even more preferably at least about 50%, and most preferably at least about 55% to preferably at most about 80%, more preferably at most about 75%, and most preferably at most about 70%.

The segments F1 in the honeycomb structure 9 may be any useful amount, size, arrangement, and shape such as those well known in the ceramic heat exchanger, catalyst and filter art with examples being described by U.S. Pat. Nos. 4,304,585; 4,335,783; 4,642,210; 4,953,627; 5,914,187; 6,669,751; and 7,112,233; EP Pat. No. 1508355; 1508356; 1516659 and Japanese Patent Publ. No. 6-47620. In addition, the segments F1 may have channels 14 with any useful size and shape as described in the just mentioned art and U.S. Pat. Nos. 4,416,676 and 4,417,908. The thickness of the walls 16 may be any useful thickness such as described in the aforementioned and U.S. Pat. No. 4,329,162.

The thickness of the cement layer 15 may be any useful thickness such as described in the art of the first sentence of the previous paragraph. The cement may be continuous or discontinuous (an example of discontinuous being described in U.S. Pat. No. 4,335,783). Typically the thickness of the cement layer 15 is from about 0.1 mm to about 10 mm. Typically, the thickness of the layer is at least 0.2, 0.5, 0.8 or 1 mm to at most about 8, 6, 5, 4 or 3 mm.

The segments F1 are adhered together by the cement layer 15. The cement layer has at least two distinct regions of differing porosity. Typically, the amount of porosity in the region of lower porosity (e.g., first fiber composition), has a porosity that is at least 5% less (65% porosity v. 70% porosity) than that in the higher region of porosity (second fiber composition). Typically, the porosity difference is at least 10%, 15%, 20% or even 25% different. Typically the region of lower porosity has a porosity of at most 65%, 60%, or even at most 55% and the region of higher porosity is, typically, at least 70%, 75%, 80% or even 85%.

In a particular embodiment, the higher porosity region is a continuous matrix with dispersed domains (e.g., corresponding to the agglomerates of the first fiber composition), within the cement layer 15. Typically, the domains of the lower porosity regions or domains are on average by number at least about 250, 300, 350, 400, 500 or even 1000 micrometers in diameter as determined by suitable microscopic techniques. Generally, the amount of higher porosity region within the cement layer 15 is from about 10% to about 90% by volume of the cement layer 15 and desirably is about 50% to about 80% of the cement layer 15.

Surprisingly, the cement layer 15 has a greater toughness for a given Young modulus and higher mechanical integrity than cements having a homogeneous distribution of porosity. Without any limiting the invention, it is believed that a continuous high porosity matrix provides high compliance (low modulus) allowing for greater strain before catastrophic crack growth occurs. The greater compliance may also be due to microcracking in the cement around the higher density agglomerates within the cement. Isolated denser agglomerates may also improve the toughness of the cement by deflecting cracks around said denser agglomerate. In addition, the denser agglomerates dispersed within the lower porosity matrix may allow for an overall stiffer cement, which may aid in the mechanical integrity of the cemented together filter.

Generally, the modulus of the higher porosity region is at least 10%, 15%, 20%, 25%, 30% or even 50% lower than the modulus of the lower porosity region. The combined modulus of the composite cement depends on the volume fraction of both phases and lies somewhere in between. However, at a given modulus (obtained in cement that is produced by using two phases of varied porosity), the corresponding fracture toughness is higher than in homogeneous material (cement of one porosity throughout) of the same modulus. This means that the cement materials of the same fracture toughness have different modulus values depending if they have two distinct regions of porosity or just one. Illustratively, the toughness of this invention's cement may reach a toughness of 0.25 MPa m½ at a Young modulus equal to about 1 GPa. In contrast, to reach the same toughness, the Young modulus for a fiber based homogeneous cement is typically at least about 2-3 GPa and for a homogeneous particulate based cement is about 4.5-6.0 GPa.

Generally, the invention's cement may have a 150% reduction in modulus without affecting the cement's toughness (comparing like porosity fiber containing cement to the cement of this invention) and 500% reduction (comparing to like porosity one-phase particulate based cement to the cement of this invention). This lower modulus at a given toughness allows for even greater soot to be retained prior to removing it by burning it off. The toughness, as used herein, is the toughness $K_{IC}$ as measured by known techniques such as referenced below in the Examples.

In a particular embodiment, the cement layer 15 has therein particulates as described above and desirably such particulates cause microcracking around said particle due, for example, to differing coefficient of thermal expansion between the particulate and the porous region it embedded in. For example, silicon carbide particles embedded within acicular mullite, higher porosity regions, cause microcracking in the cement layer, thus lowering the effective elastic modulus of the cement layer. This lowering of the effective Young's modulus is believed to even further enhance the ability of the honeycomb structure to resist thermal shock damage. The amount of such "inert" particulates described above may be any useful amount, but, generally is at most about 20%, 15%, or 10% by volume of the cement layer 15.

Method of Making the Honeycomb Structure

In making the honeycomb structure of this invention, the total amount of carrier fluid that is used may vary over a wide range depending on other organic additives such as those described below and the solids loading of the fiber and the technique used to contact the segments together. The total amount of fluid (e.g., water) generally is at least about 40% by volume to at most about 90% of the inorganic fraction of the cement.

The cement may contain other useful components, such as those known in the art of making ceramic pastes. Examples of other useful components include dispersants, deflocculants, flocculants, plasticizers, defoamers, lubricants and preservatives, such as those described in Chapters 10-12 of Introduction to the Principles of Ceramic Processing, J. Reed, John Wiley and Sons, NY, 1988. When an organic plasticizer is used, it desirably is a polyethylene glycol, fatty acid, fatty acid ester or combination thereof.

The cement may also contain binders. Examples of binders include cellulose ethers, such as those described in Chapter 11 of Introduction to the Principles of Ceramic Processing, J. Reed, John Wiley and Sons, NY, N.Y., 1988. Preferably, the binder is a methylcellulose or ethylcellulose, such as those available from The Dow Chemical Company under the trademarks METHOCEL and ETHOCEL. Preferably, the binder dissolves in the carrier liquid.

The cement, generally and desirably has a shear thinning behavior. Shear thinning means that the viscosity at a higher shear rate is lower than the viscosity at a lower shear rate. Illustratively, the viscosity at a low shear rate (i.e., about 5 s$^{-1}$) is typically at least about 5, 10, 25, 50, 75 or even 100 Pa·s, and the viscosity at high shear (i.e., about 200 s$^{-1}$) is typically at most about 1, 0.5, 0.1, 0.05, or even 0.01 Pa·s. Such viscosity measurements may be made by rheometers for measuring such cements at such shear rates and viscosities as the one described herein.

After a segment or segments is contacted on its outer surface with the cement, the segment is contacted with the cement interposed between the segments by any suitable method of doing so. In a particular embodiment, the segments are first exposed to neat carrier fluid so that they are wet when the cement (paste) is contacted to the surface. In a particular embodiment, the just mentioned wetting of the carrier fluid is advantageously done using a colloidal sol such as one described above. In this embodiment, the colloid is present throughout each of the segments and has been surprisingly found to be useful in trapping liquid particulate fractions of soot emitted from a Diesel engine. The colloidal sol may be introduced into the segments of the honeycomb structure after the honeycomb structure has been made. The method used may be any suitable for applying a fluid, such as dipping, spraying, injecting, brushing or combination thereof. The sol may be anyone of those already described herein.

Illustratively, the segments, having, for example, a square cross-section, may be held in a jig and the cement squirted or injected in the gaps between the segments. The segments may have the cement deposited on the desired outer surface, which is followed by fitting the segments together using a jig to align initial rows and columns of segments. The jig may also have spacers such that the segments have a substantially equidistant spacing resulting in more uniform cement thicknesses. Alternatively, the segments may be placed on a flat surface and built up in a manner similar to brick masonry, which also may be aided by the use of spacers between the segments.

Once the segments are adhered, the carrier fluid is removed by heating or any suitable method, which may include just ambient evaporation or any other useful method such as those known in the art. The removal of the carrier fluid may also occur during the heating to chemically (ceramically) bond cement components and segments together. Heating may also be used to remove any organic additives in the segments or cement. This heating may be any suitable such as those known in the art and may also occur during the heating to ceramically bond the cement and segments together. To ceramically bond the cement and segments, the heating should not be to a temperature that is so high that deleterious effects occur, such as, crystallization occurring in the fiber (unless desired) or sagging of the honeycomb. Typically the temperature is at least about 600° C., 650° C., 700° C., 750° C. or 800° C. to at most about 1200° C., 1150° C., 1100° C., 1050° C. or 1000° C.

In a particular embodiment, the honeycomb segments F1 are acicular mullite and the cement is comprised of particulate precursors that form mullite. In such an embodiment, the heating is performed under a fluorine containing atmosphere. Generally in the method, ceramic honeycombs cemented with a cement 15 is heated to a first temperature for a time sufficient to convert the precursor compounds in the porous body to fluorotopaz and then raised to a second temperature sufficient to form the mullite composition. The temperature may also be cycled between the first and second temperature to ensure complete mullite formation. The first temperature may be from about 500° C. to about 950° C. Preferably, the first temperature is at least about 550° C., more preferably at least about 650° C. and most preferably at least about 725° C. to preferably at most about 850° C., more preferably at most about 800° C. and most preferably at most about 775° C.

The second temperature may be any temperature suitable depending on variables such as the partial pressure of $SiF_4$. Generally, the second temperature is at least about 960° C. to at most about 1700° C. Preferably, the second temperature is at least about 1050° C., more preferably at least about 1075° C. and most preferably at least about 1100° C. to preferably at most about 1600° C., more preferably at most about 1400° C. and most preferably at most about 1200° C.

Generally, during the heating to the first temperature, the atmosphere is inert (e.g., nitrogen) or a vacuum until at least about 500° C., which is when a separately provided fluorine containing gas is desirably introduced. During heating to the first temperature, organic compounds and water may be removed. These may also be removed in a separate heating step common in the art described in Introduction to the Principles of Ceramic Processing, J. Reed, Wiley Interscience, 1988. This separate heating step is commonly referred to as binder burnout.

After cooling, the ceramic honeycomb structure ma be further heat treated to improve the retained strength. This heat treatment may be carried out in air, water vapor, oxygen, an inert gas or mixture thereof for a time sufficient to improve the strength. Examples of inert gases include nitrogen and the noble gases (i.e., He, Ar, Ne, Kr, Xe, and Rn). Preferably, the heat treatment atmosphere is an inert gas, air, water vapor or mixture thereof. More preferably, the heat treatment atmosphere is nitrogen, air or air containing water vapor.

The time at the heat treatment temperature is a function of the heat treatment atmosphere, particular mullite composition and temperature selected. For example, a heat treatment in wet air (air saturated with water vapor at about 40° C.) generally requires more than several hours to 48 hours at 1000° C. In contrast, ambient air, dry air or nitrogen (air having a relative humidity from about 20 percent to 80 percent at room temperature) desirably is heated to 1400° C. for at least about 2 hours.

Generally, the time at the heat treatment temperature is at least about 0.5 hour and is dependent on the temperature used (i.e., generally, the higher the temperature, the shorter the time may be). Preferably, the time at the heat treatment temperature is at least about 1 hour, more preferably at least about 2 hours, even more preferably at least about 4 hours and most preferably at least about 8 hours to preferably at most about 4 days, more preferably at most about 3 days, even more preferably at most about 2.5 days and most preferably at most about 2 days.

EXAMPLES

Example 1

Cement was prepared by mixing 30.0% by weight of 300 micrometer agglomerates of a mullite precursor, (Component A), 14.74% by weight of graphite available from Cumming Moore Carbon Inc., Detroit, Mich. under the tradename A625 having a average particle size of about 30 micrometers (Component B), 7.89% by weight attrited alumina and clay (Component C), 1.05% by weight of a cellulose ether binder METHOCEL A4M (available from The Dow Chemical Company, Midland Mich.) (Component D) and 46.32% of water.

The attrited mixture of Component C was made using 53% by weight of Todd Dark ball clay (from Kentucky Tennessee Clay Company), 44% by weight of kappa alumina from Selecto Inc. Suwanee, Ga. and 3% talc MB-50-60 from Whitaker-Clark-Daniel Inc. The powders were milled for 3 hours using laboratory attritor (available from Union Process Inc. Akron, Ohio) at 500 rpm using 5 mm yttrium Stabilized Zirconia balls in a 500 ml container. The attrited powder had an average particle size between 2 to 3 micrometers.

The mullite precursor agglomerates (Component A) were made by crushing larger calcined acicular mullite honeycombs and grinding them for 1 minute in Coffee grinder (Mr. Coffee). The ground honeycomb agglomerates were sieved through a 40 mesh screen and then a 60 mesh screen. The agglomerates retained on the 60 mesh screen were utilized and had an average agglomerate size of about 300 micrometers in diameter (diameter or average size indicates herein equivalent spherical diameter).

Honeycomb segments having mullite precursors (1.5×1.5×6 inches) were made in a similar manner as described in the Examples of U.S. Pat. No. 7,425,297 to the point prior to heating under a silicon tetrafluoride atmosphere (calcined honeycomb segments). Four of these calcined honeycomb segments were coated with cement described above on each face to be joined and pressed together to create approximately a 1.5 millimeter thick joint layer. The excess cement was scraped off. They were dried overnight at room temperature and then dried an additional 24 hours at 110° C. After drying the samples were further heated in air (calcined) at 1065° C. for 4 hours to remove, for example, the graphite porogen and to lightly bond the cement and segments to form a calcined ceramic honeycomb structure.

This calcined ceramic honeycomb structure was then heated to 1100° C. under an atmosphere of 400 torr of $SiF_4$ to convert the segements and cement into acicular mullite grains chemically bonded together with regions of differing porosity. The conditions used to form such mullite were similar to that used in the Examples of U.S. Pat. No. 7,425,297. Finally, the mullitized ceramic honeycomb structure was further heated in air to 1400° C. and held at that temperature for 2 hours.

The cement had an overall porosity of about 70%. The regions associated with the agglomerates had mullite needles chemically bonded together with a porosity of about 65%, which was essentially the same as the honeycomb segments themselves. These regions were dispersed in a matrix of bonded together acicular mullite acicular grains arising from the milled powders having the graphite porogen. This matrix region had a porosity of about 83-87%. The overall porosity was determined by water immersion technique. The porosity of the regions and matrix were determined by water immersion technique testing individual components separately.

The resultant acicular mullite ceramic honeycomb structure was cut into bars so as to measure the Young's modulus of the resultant cement of this invention. Young's modulus of the cement was tested following the method outlined in ASTM C 1259-94, "Standard Test Method for Dynamic Young's Modulus, Shear Modulus, and Poisson's Ratio for Advanced Ceramics by Impulse Excitation of Vibration".

Figure 2:
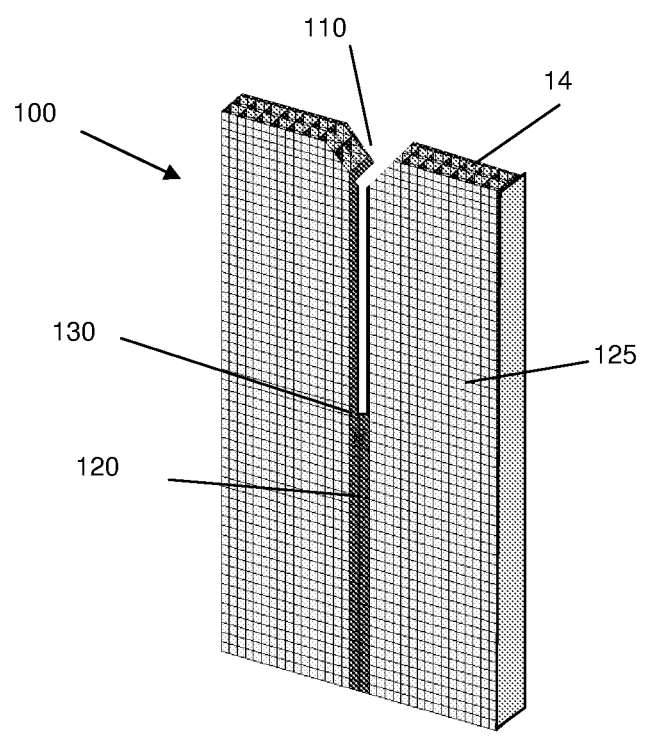
FIG. 2 is an illustration of the sample used to measure the toughness ($K_{IC}$) of the cement cut out from a ceramic honeycomb structure.

The fracture toughness of the cement was measured using a honeycomb/cement/honeycomb sandwiched double cantilever beam (SDCB) method as shown in FIG. 2 and further described below. The method enables crack growth in the cement bonding the segments together and as such the calculation of the crack growth resistance curve (R-curve) of the cement was done in a known manner such as described in G. de With, "Small-Specimen Double-Cantilever-Beam Test Applicable to Monoliths and Joints," *J. Am. Ceram. Soc.*, 72 [4] 710-12 (1989) and A. J. Moorhead and P. F. Becher, "Adaptation of the DCB Test for Determining Fracture Toughness of Brazed Joints in Ceramic Materials," *Journal of Materials Science*, 22 3297-3303 (1987).

The SDCB specimen (100) was cut from the ceramic honeycomb structure of this Example, as shown in FIG. 2, and was positioned vertically. The V-notch (110) was machined into the cement (120) and honeycomb segments (125), and the crack tip (130) was shaped with a thin diamond-tipped wire. The SDCB specimen (100) was about 1" (25.4 mm) wide, and 2" (50.8 mm) tall 0.223" (5.66 mm) thick. The V-notch had a depth of about 3/16" (4.76 mm) and width of about 3/8" (9.52 mm).

Samples were tested on a 8500 Servo-hydraulic Instron test frame. The test fixture consisted of a silicon carbide bottom push rod with a flat silicon carbide platen, which the sample sits on. The top portion of the test fixture used a silicon carbide rod with a hole drilled through the end to accept a 0.25" (6.35 mm) silicon carbide pin. The sample was placed on the bottom platen and the crosshead was raised manually, while centering the v-notch (110) of the sample (100) with the pin. The sample (100) was pre-loaded to 1 pound (454 grams) to insure good contact between the pin and sides of the v-notch (110). The test method used a displacement rate of 0.001 inch/min (0.0254 mm/min) and a data sampling rate of 2 hertz. The computer controlled program was started and the load-displacement curve acquired. The extremely slow displacement rate allows for a stable crack growth during the test.

Using finite element analysis (FEA), a model was developed based on geometrical dimensions and mechanical properties of the honeycomb and cement of the SCDB specimen 100. Using computational fracture mechanical analysis (using ABAQUS software available from SIMULIA, Providence, R.I.), a compliance curve was developed as a function of crack length and the corresponding stress intensity factor (ST) by the moving crack tip. For the experimental data in the load-displacement curve, a crack length was determined by matching the experimental and numerical compliance and calculating the fracture resistance in terms of the ST. In this way, an R-curve was generated through iterative data reduction and the highest point of the R-curve reported as the fracture toughness.

The fracture toughness of the cement was 0.25 MPa•m$^{1/2}$. The R-curve exhibited rising behavior (greater resistance) to crack propagation as the crack extended until the maximum toughness of 0.25 MPa•m$^{1/2}$ was reached. The Young's modulus of the cement was about 1 GPa. The ratio of toughness (MPa•m$^{1/2}$) to modulus (GPa) was 0.25.

Comparative Examples

For comparative purposes, several other cement bonded ceramic segments were made and tested. All of the Comparative Example cements have essentially only one porosity throughout the cement.

Comparative material A was fabricated from the same ingredients as in Example 1, except that a carbon porogen was not added to the milled powder mixture. The cement produced contained acicular mullite grains bonded together having one essentially uniform porosity of about 65%. The modulus of the cement was about 18 GPa and the toughness was 0.7 MPa•m$^{1/2}$. Even though the value of toughness was higher than in the Example, the modulus was substantially much higher resulting in reduced thermal shock resistance of the cement and ceramic honeycomb structure. In addition, the R-curve was flat, such that the cement failed in a brittle manner. The high Young's modulus resulted in toughness/ Young's modulus ratio of only 0.04.

Comparative Example B was a commercial silicon carbide honeycomb structure available from NGK Insulators LTD (Nagoya, Japan). This honeycomb structure had silicon carbide honeycomb segments joined by a ceramic fiber based cement. The toughness was about 0.24 MPa•m$^{1/2}$, the R-curve was rising and the Young's modulus was about 2.7 GPa. The porosity of the material was essentially the same throughout the entire sample. The ratio of toughness to modulus was 0.09.

TABLE 1

| Example | Cement Toughness MPa·m$^{1/2}$ | Cement Modulus (GPA) | Ratio (Toughness/ Modulus) |
|---|---|---|---|
| 1 | 0.25 | 1 | 0.25 |
| Comparative A | 0.7 | 18 | 0.04 |
| Comparative B | 0.24 | 2.7 | 0.09 |

Modulus = Young's modulus

From the Table 1 summary of the data for each of the Examples and Comparative Examples, it is readily apparent that the ratio of the cement in the ceramic honeycomb structure of this invention has a significantly higher toughness/ Young's modulus ratio and lower modulus.

Engine Testing of Segmented Filters:

Two acicular mullite segmented DPFs were made by adhering 16 individual 1.5×1.5×7 inch acicular mullite honeycombs using the cement described in Example 1 (herein Example 1E) and the cement described in Comparative Example A (herein Comparative Example AE). The cemented assemblies were calcined at 1065 C for 1 hour in order to remove binder and strengthen the cement bond. After calcination, the assembly was ground to a 5.6 inch diameter and 6 inch segmented particulate filter. A cement skin was applied to both segmented particulate filters. The skin cement consisted of 62 parts by weight (pbw) MULCOA mullite powder having an average particle size of 325 mesh (CE Minerals, Andersonville, Ga.), 4.8 pbw of WF-7 Industrial Nut Powder (Agrashell, Los Angeles, Calif.), 1.4 pbw METHOCELL A15L cellulose ether binder also available from The Dow Chemical Company and 31.9 pbw of water was mixed to form a paste that was troweled upon each of the segmented particulate filters to a thickness of about 2 mm. The skinned segmented filters were dried at 80° C. for 24 hours.

The segmented filters were heated in the same manner as described in Example 1 and Comparative Example A to form the mullite cements described above. Both Example 1E and Comp. Ex. AE showed no visible defects or cracks at this stage.

Each of the segmented filters was canned and then loaded with soot in the same manner using Volkswagen 1.9-liter four-cylinder direct injection (DI) diesel engine with four valves and a common rail injection system operating at 2500 rpm and 4.5 bar BMEP (Brake Mean Equivalent Power). This condition delivers an exhaust mass flow of ~125 kg/h and an exhaust temperature of about 300° C., representing a vehicle driving condition with a constant speed of ~80 km/h for an average mid-size European passenger car. Each of the filters was loaded with about 10 grams of soot per liter.

Upon reaching the above soot level, the soot is burned off (regenerated) by using post cylinder fuel injection such that the exhaust temperature reaches 610° C.+/−20° C. just upstream of the segmented filter. To simulate a runaway regeneration (severe thermal shock), as soon as the soot burning starts indicated by a drop in pressure across the filter, the engine is automatically switched to idle operation and post injection deactivated. The soot continues to burn and the engine speed is kept at idle for 5 minutes until the exhaust temperature is stabilized in idle condition.

During this simulated runaway regeneration, each of the segmented filters showed a maximum difference in temperature from the skin and the hottest spot in the honeycombs of about 700° C. and a maximum temperature of about 1250° C. After regeneration both DPFs were inspected. The Example 1E filter showed no visible cracks or delaminations in the channels (measured by boroscope) or on the surface (characterized by optical microscope with 200× magnification). No black channels were observed. The filtration efficiency stayed the same within experimental error between 95-93%.

In contrast, Comparative Example AE had multiple vertical and horizontal cracks on the skin surface and several black channels. In addition, extensive network of microcracks was present in the cement joint corners. It was also apparent that the cement and the segment body were separating.

The invention claimed is:

1. A ceramic honeycomb structure comprised of at least two separate smaller ceramic honeycombs that have been adhered together by a cement layer comprised of fibers in which the cement layer has at least two regions of differing porosity, wherein the cement layer has a region of lower porosity dispersed within a second continuous matrix of higher porosity, wherein the region of lower porosity has a porosity of at most about 65% and the region of higher porosity has a porosity of at least about 70% and the lower porosity regions have an average size of at least about 300 micrometers.

2. The ceramic honeycomb structure of claim 1 wherein the cement has a $K_{IC}$/toughness (MPa·m$^{1/2}$)/Young's modulus (GPa) ratio of at least 0.1.

3. The ceramic honeycomb structure of claim 2, wherein the cement has a $K_{IC}$/toughness (MPa·m$^{1/2}$)/Young's modulus (GPa) ratio of at least 0.15.

4. The ceramic honeycomb structure of claim 3, wherein the cement has a $K_{IC}$/toughness (MPa·m$^{1/2}$)/Young's modulus (GPa) ratio of at least 0.2.

5. The ceramic honeycomb structure of claim 1, wherein the lower porosity region has a porosity of at most 60%.

6. The ceramic honeycomb structure of claim 5, wherein the higher porosity region has a porosity of at least 75%.

7. The ceramic honeycomb structure of claim 6, wherein the higher porosity region has a porosity of at least 80%.

8. The ceramic honeycomb structure of claim 7, wherein the higher porosity region has a porosity of at least 85%.

9. The ceramic honeycomb structure of claim 1, wherein lower porosity regions have an average size of at least about 350 micrometers.

10. The ceramic honeycomb structure of claim 1, wherein at least one region has microcracking.

11. The ceramic honeycomb structure of claim 10, wherein the microcracking is present around particulates embedded within the cement layer, the particulates having a coefficient of thermal expansion different than the cement layer they are embedded in.

12. The ceramic honeycomb structure of claim 11, wherein the particulates are silicon carbide particulates.

13. The ceramic honeycomb structure of claim 12, wherein the smaller honeycombs are acicular mullite.

14. The ceramic honeycomb structure of claim 13, wherein the regions of the cement layer are acicular mullite.

* * * * *